United States Patent
Sankaran et al.

(10) Patent No.: US 7,650,312 B2
(45) Date of Patent: Jan. 19, 2010

(54) METHOD AND SYSTEM TO ENABLE CONTINUOUS MONITORING OF INTEGRITY AND VALIDITY OF A DIGITAL CONTENT

(75) Inventors: Ayyappan Sankaran, San Jose, CA (US); Jayan Ramankutty, Fremont, CA (US); Jayant Kadambi, Mountain View, CA (US)

(73) Assignee: Yume Networks, Inc., San Jose, CA (US)

( * ) Notice: Subject to any disclaimer, the term of this patent is extended or adjusted under 35 U.S.C. 154(b) by 285 days.

(21) Appl. No.: 11/433,455

(22) Filed: May 15, 2006

(65) Prior Publication Data

US 2006/0277151 A1    Dec. 7, 2006

Related U.S. Application Data

(60) Provisional application No. 60/687,824, filed on Jun. 6, 2005.

(51) Int. Cl.
*G06F 17/60* (2006.01)
(52) U.S. Cl. .............................. 705/57; 705/59; 705/50; 705/51

(58) Field of Classification Search ................... 705/57, 705/59, 50, 51
See application file for complete search history.

(56) References Cited

U.S. PATENT DOCUMENTS

| | | | |
|---|---|---|---|
| 2004/0128251 A1* | 7/2004 | Adam et al. .................. | 705/59 |
| 2006/0010074 A1* | 1/2006 | Zeitsiff et al. ................ | 705/52 |
| 2006/0280301 A1* | 12/2006 | Oliveira et al. ............. | 380/212 |
| 2007/0038578 A1* | 2/2007 | Liu et al. ...................... | 705/62 |
| 2008/0010452 A1* | 1/2008 | Holtzman et al. ........... | 713/158 |
| 2008/0310623 A1* | 12/2008 | Phillips et al. ................ | 380/29 |
| 2009/0171715 A1* | 7/2009 | Conley et al. .................. | 705/7 |
| 2009/0172281 A1* | 7/2009 | Jogand-Coulomb et al. . | 711/115 |

FOREIGN PATENT DOCUMENTS

JP    2008092432 A    *    4/2008

* cited by examiner

*Primary Examiner*—Pierre E Elisca
(74) *Attorney, Agent, or Firm*—Lau & Associates, LLC.

(57) ABSTRACT

A method and a system for securely transmitting a digital content in a digital right management (DRM) network, the method comprising partitioning the digital content into a plurality of fragments. The method further comprises associating each fragment with a license key. Each fragment is encrypted with the corresponding license key and are sent to an electronic device in response to receiving a request for the digital content.

15 Claims, 4 Drawing Sheets

METHOD AND SYSTEM TO ENABLE CONTINUOUS MONITORING OF INTEGRITY AND VALIDITY OF A DIGITAL CONTENT

This application claims the priority of U.S. Provisional Application No. US 60/687,824 filed on Jun. 6, 2005.

FIELD OF THE INVENTION

The present invention relates generally to a method and a system for distribution, transfer and protection of digital content, and, more specifically, the present invention relates to a method and system to enable continuous monitoring of integrity and validity of a digital content.

BACKGROUND OF THE INVENTION

Digital Rights Management (DRM) is a tool that allows owners of digital content to protect and secure the delivery of their assets. DRM is a generic term for an encryption technology that modifies the file such that it is unusable until a license or key is granted. DRM helps protect and securely deliver digital content during its deployment, transport, and download, prior to its playback on an electronic device. The electronic device can be for example, a computer, set-top box or TV. Protected content is encrypted and requires a corresponding license in order to be played back on the electronic device. The license allows decryption of the content and dictates how the content may be used.

Existing technologies allow a license to be granted for a digital content that is valid for the complete duration of the digital content. Such license needs to be obtained before the digital content is played and is obtained for the digital content as a whole. In order to maintain security of the digital content, the digital content is encrypted with one or more keys. In order to play the digital content, the digital content, as a whole, must be decrypted and stored in a volatile memory of a display device. However, when the digital content size grows, the requirements of the volatile memory also increases, thereby making it imperative to use hard disk drives to store the decrypted digital content. The security is not maintained since the hard disk can be removed and the unencrypted digital content copied onto another storage device.

Further, with respect to existing systems, the digital content can be encrypted and requires an authorization license in order to be decrypted and played back. The authorization license allows decryption of the digital content and dictates the usage of the digital content. As a result, it becomes cumbersome for a content provider to distribute the digital content in a physical format delivery and further ensure protection of the digital content.

Therefore there is a need for a system to enable continuous monitoring of integrity and validity of digital content.

SUMMARY OF THE INVENTION

An aspect of the invention is to provide a method and a system to enable continuous monitoring of integrity and validity of digital content.

In order to fulfill above aspect, the method comprises partitioning the digital content into a plurality of fragments. Thereafter, associating each fragment with a license key and encrypting each fragment with the corresponding license key. The method further comprises sending a plurality of encrypted fragments to an electronic device, in response to receiving a request for the digital content.

BRIEF DESCRIPTION OF THE DIAGRAMS

The accompanying figures, together with the detailed description below are incorporated in and form part of the specification, serve to further illustrate various embodiments and to explain various principles and advantages all in accordance with the present invention, and should not be construed to limit the invention.

DETAILED DESCRIPTION

Figure 1:
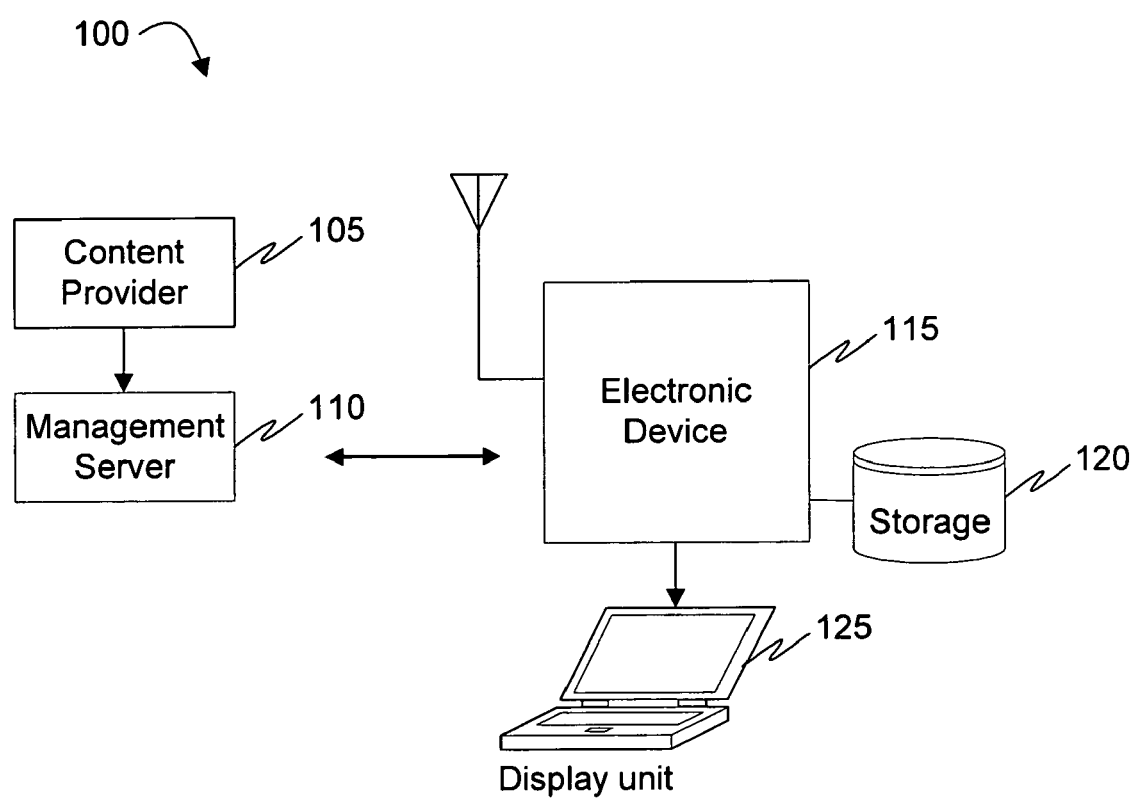
FIG. 1 illustrates an exemplary configuration of a system enabling continuous monitoring of integrity and validity of a digital content, in accordance with an embodiment of the present invention.

It is believed that this present invention will be better understood from a consideration of the following description in conjunction with the drawings, in which like reference numerals are carried forward.

As required, detailed embodiments of the present invention are disclosed herein; however, it is to be understood that the disclosed embodiments are merely exemplary of the present invention, which can be embodied in various forms. Therefore, specific structural and functional details disclosed herein are not to be interpreted as limiting, but merely as a representative basis for teaching one skilled in the art to variously employ the present invention in virtually any appropriately detailed structure. Further, the terms and phrases used herein are not intended to be limiting but rather to provide an understandable description of the present invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Generally speaking, pursuant to various embodiments, the present invention provides methods and systems that make it possible to protect and securely deliver a digital content for playback on the subscribers' electronic devices by continuously monitoring the integrity and validity of the digital content. The system's built-in DRM capabilities allow for a seamless and a secure flow of digital content across broadband and a service providers networks, regardless of where the digital content is, and independently of the encryption or DRM type. The digital content can comprise a movie, a video, and a viewable online content, or a non-movie content that includes a TV serial, a documentary, or a game.

Referring now to FIG. 1, an exemplary configuration of a system 100 enabling continuous monitoring of integrity and validity of a digital content is depicted in accordance with an embodiment of the present invention. The digital content can be, for example, a movie, a video, and a viewable online content, or a non-movie content that can include a TV serial, a documentary, or a game. System 100 comprises a content provider 105, a management server 110, an electronic device 115 coupled with a storage 120 and a display unit 125. Content provider 105 can be a video production house or a film production house. Further, content provider 105 can be a site management company or a television channel that owns the rights for a distribution of the digital content. Additionally, content provider 105 can be a TV channel, a documentary production house, or a company that creates games to be played on a computing device.

Management server 110 receives a request for a digital content from electronic device 115. Upon receiving the request management server 110 obtains the digital content from content provider 105. Having received the digital content, management server 110 partitions the digital content into a plurality of fragments. Management server 110 further generates a plurality of protected fragments by encrypting each fragment with a unique encryption key. Each protected fragment is associated with a corresponding license. The license can comprise content provider's requirement, an Internet Service Provider's (ISP's) Service Level Agreement (SLA), or profile of a user of electronic device 115. Therefore, the protected fragments can only be accessed by the user, as permitted by the license associated with the protected fragment. The license can determine the usage of the digital content, and the plurality of rights with respect to playing or retrieving the digital content that may be granted depending on a predetermined criteria. The predetermined criteria may be a content provider's condition or a broadband service provider's condition. In an embodiment of the present invention, a different license may be associated with each protected fragment, thereby having a unique license associated with each protected fragment. Management server 110 can also store the plurality of fragments depending on an arrangement with content provider 105, for example the arrangement may contemplate a one time payment by the user of electronic device 115 for obtaining the digital content from content provider 105. A transmission interface can transmit the plurality of protected fragments to electronic device 115.

Electronic device 115 can be, for example, a set-top box, a computing device, a multi-media player or a television set. Electronic device 115 can be coupled to storage 120 that stores digital content. Electronic device 115 can process the plurality of protected fragments in order to enable an authorized viewer to view the digital content on display unit 125 as permitted by the license. The functionality at management server 110 as mentioned herein is not exhaustive and could be implemented by various other methods.

Figure 2:
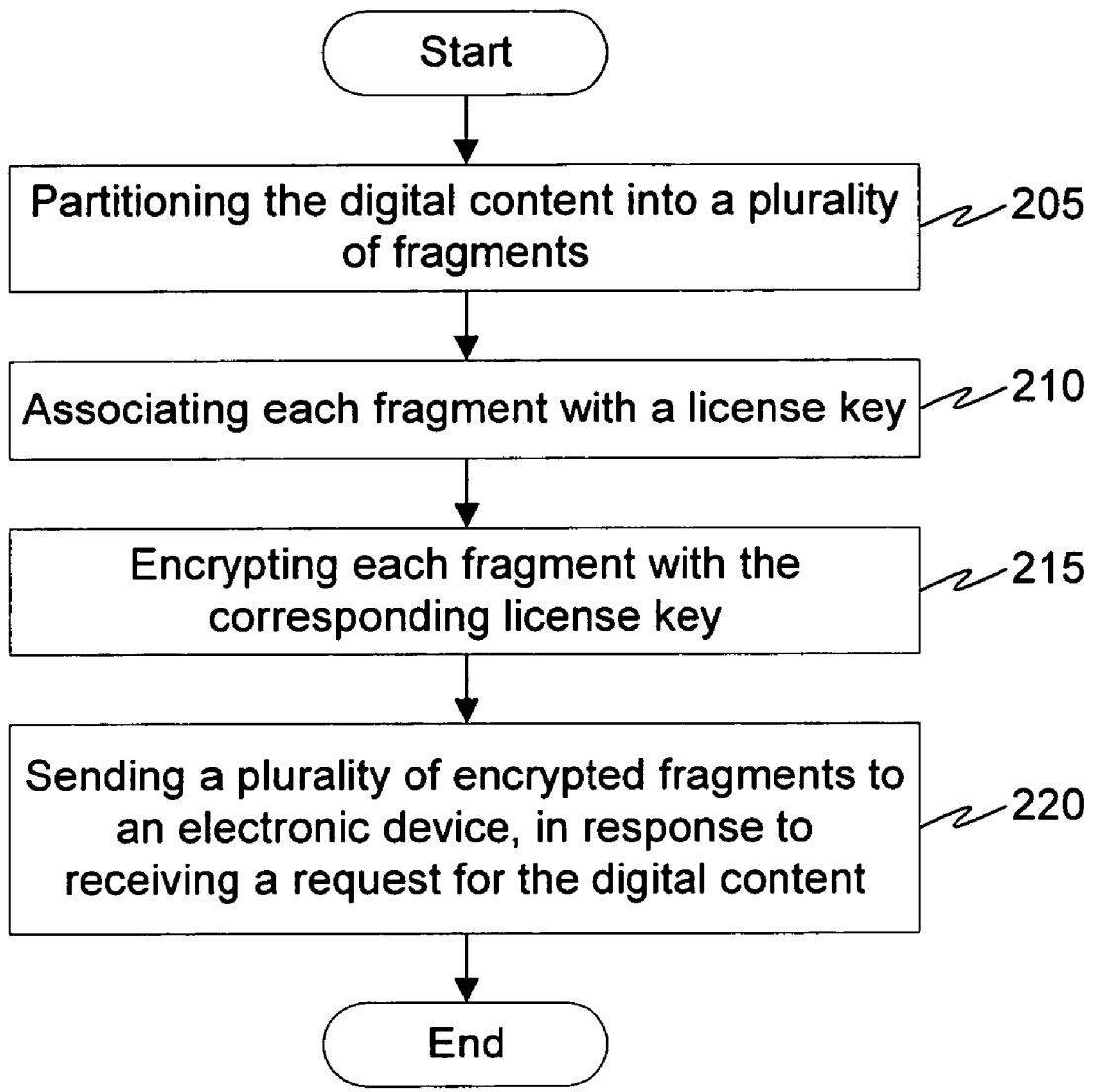
FIG. 2 illustrates a flow diagram of a method for securely transmitting a digital content in a digital right management (DRM) network, in accordance with an embodiment of the present invention.

Referring now to FIG. 2, a flow diagram of a method for securely transmitting a digital content in a digital right management (DRM) network is shown in accordance with an embodiment of the present invention. At step 205, the digital content is portioned into a plurality of fragments. At step 210, each of the plurality of fragments is associated with a license key to obtain encrypted fragments of the digital content. At step 215, each fragment is encrypted with the corresponding license key. The license key can be different for different fragments of the digital content and can provide better control over the digital content, since a single license key cannot decrypt all the encrypted fragments. In an embodiment of the present invention, the encryption can be performed using 1024-bit triple data encryption standard (3DES) equivalent algorithm. In another embodiment of the present invention, the encryption can be preformed using Advanced Encryption Standard (AES) with 128-bit keys, using both the Electronic Codebook (ECB) and Counter (CTR) modes. As mentioned earlier, the partitioning of the digital content into a plurality of fragments and subsequent processing of each fragment separately reduces a volatile memory requirement at electronic device since the volatile memory would be required only to process each fragment as and when electronic device receives the fragment, as opposed to processing the whole digital content. The partitioning of the digital content and the association of the fragments with the license keys can be done at management server. At step 220, the plurality of encrypted fragments is sent to electronic device in response to receiving a request for the digital content. Those skilled in the art shall realize that the request to content provider for the digital content can be made either by a user of electronic device or by management server.

In an embodiment of the present invention the digital content that the user of electronic device requests for is stored on management server in the DRM network. In another embodiment, the digital content can be provided by a video production house, a film production house, a site management company, a television channel, a documentary production house or a company that creates games to be played on a computer or a similar device.

Figure 3:
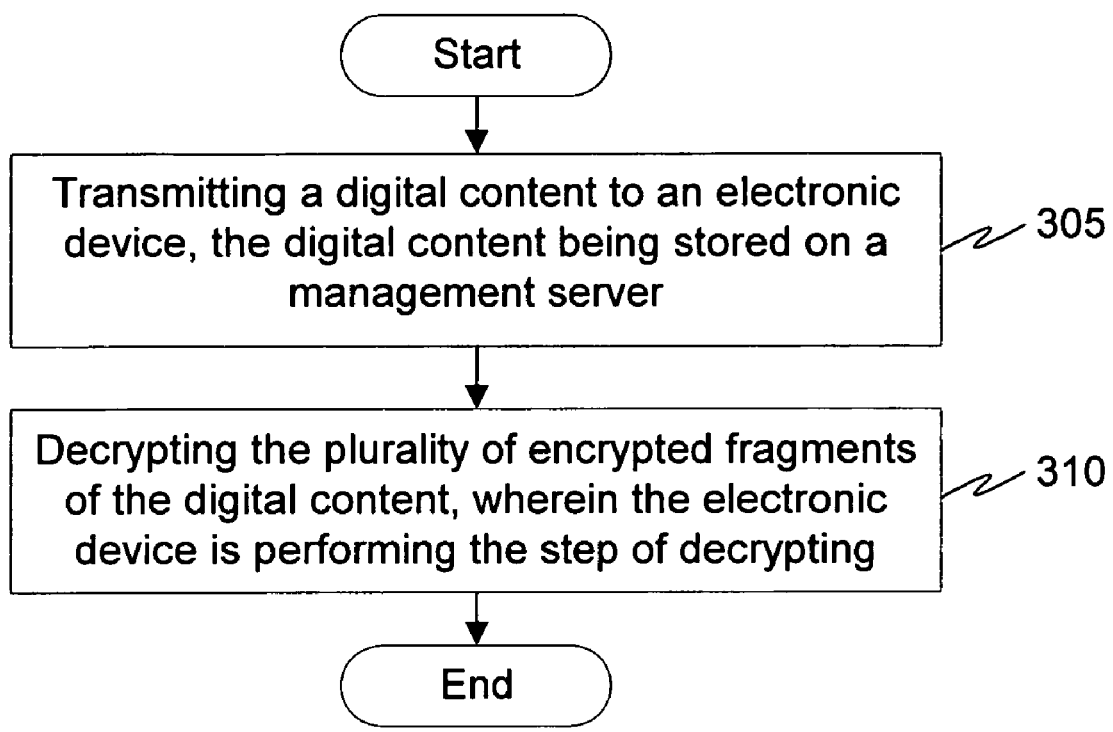
FIG. 3 illustrates a flow diagram of a method of communication in a digital rights management (DRM) network, in accordance with an embodiment of the present invention.

Referring to FIG. 3, a flow diagram of a method of communication in a digital rights management (DRM) network is shown in accordance with an embodiment of the present invention. The digital content is transmitted to electronic device in response to receiving the request for the digital content.

At step 305, management server transmits the digital content to an electronic device. The method of transmission of the digital content to electronic device is explained in conjunction with FIG. 2. Upon receiving the encrypted fragments of the digital content, at step 210, electronic device decrypts the encrypted fragments. In an embodiment of the present invention, electronic device can request management server for authorization of the encrypted fragment. Electronic device may further ask for a corresponding license key for decrypting the encrypted fragment.

In an embodiment of the present invention a plurality of fragments of a digital content are encrypted using a corresponding license key. This enables constant license key monitoring during playback. Electronic device can continuously request for a license key corresponding to an encrypted fragment. On determining that the user of electronic device is authorized to process the encrypted fragment, for example on successfully receiving the license, electronic device requests for a license key to decrypt each encrypted fragment. The license key can decrypt the encrypted fragment only if the user is authorized to receive the encrypted fragment and the license key as determined by the license. As stated earlier, the license key corresponds to only one encrypted fragment and therefore a different license key has to be received for each encrypted fragment of the plurality of encrypted fragments.

The decrypted fragments may be stored in storage coupled to electronic device. The decrypted digital content comprising various decrypted fragments is then sent to display unit for displaying it to the user. The digital content may be viewed once, or several times, and the viewing may be time-limited, for example for a week, depending on the type of subscription. Since a unique license key is required for each encrypted fragment, and further since a license would be required for each encrypted fragment to be decrypted at electronic device, the user can be prevented from pausing the video, and subsequently attempting to copy a digital file, comprising the digital content, at a later time. Further, using a unique and a constantly changing license key prevents a long-term license key retrieval algorithm being used over a period of time on the digital content stored at electronic device. Also, by continually authorizing the user for each encrypted fragment, wherein a license key may also be unique for each encrypted fragment, additional control can be maintained over the plurality of encrypted fragments. A license can determine the usage of the digital content, and the plurality of rights with respect to playing or retrieving the digital content that may be granted, depending on a predetermined criterion. The predetermined criteria may be a content provider's condition or a broadband service provider's condition. The present invention can enable a plurality of new distribution scenarios and provide a plurality of content owners, and providers, and consumers greater access to a protected content.

According to an embodiment of the present invention, two different license types can be granted, one for electronic device, for example a set top box, that is to play the digital content, and the other for the individual content on electronic device itself. An individual license set is granted for each separate content file that is downloaded to electronic device.

Figure 4:
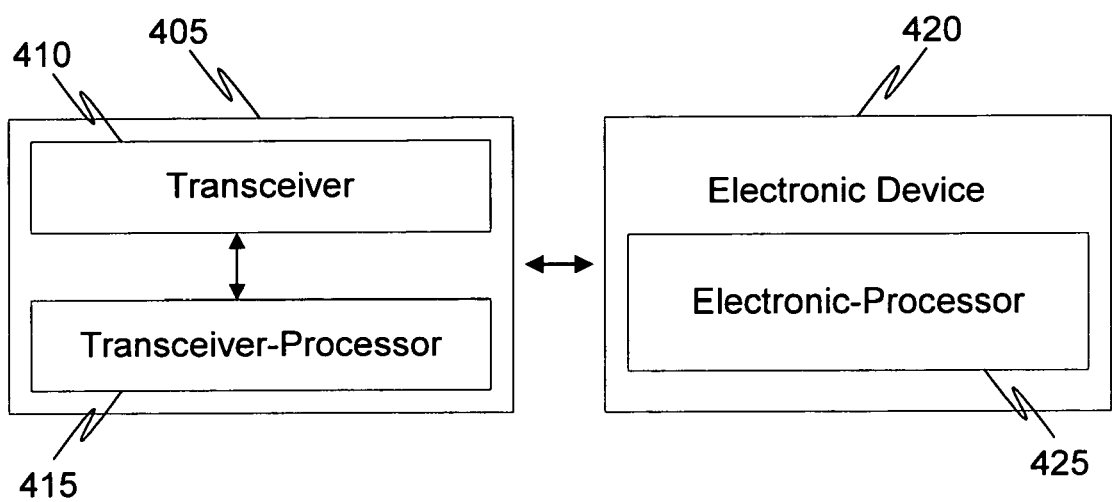
FIG. 4 illustrates a block diagram depicting a system for communication in a Digital right management (DRM) network, in accordance with an embodiment of the present invention.

Referring now to FIG. 4, a block diagram depicting a system for communication in a Digital right management (DRM) network is shown in accordance with an embodiment of the present invention. A device 405 comprising a transceiver 410 operatively coupled to a transceiver-processor 415 is shown. Those skilled in the art shall realize that the device 405 can reside on the management server or can be an external device. Content provider provides a digital content requested by a user of electronic device to device 405. Transceiver-processor 415 is configured to partition the digital content into a plurality of fragments. The transceiver-processor 415, then, associates each fragment with a corresponding license key. The license keys can be different for different fragments to acquire increased security. Each fragment is encrypted with the corresponding license key. Transceiver 410 sends these encrypted fragments of the digital content to the requesting electronic device, as opposed to sending an entire encrypted digital content. This ensures better security for the digital content and lesser resource utilization at electronic device.

Electronic device 115 of FIG. 1 is depicted as electronic device 420 in FIG. 4. Electronic device 420 can be a set-top box, a computing device, a multi-media player or a television set. Electronic device 420 comprises an electronic processor 425. Electronic device 420 receives the digital content that is fragmented and encrypted from device 405. Electronic-processor 425 can be configured to decrypt the plurality of encrypted fragments of the digital content. For the purpose of decrypting, electronic-processor 425 is configured to request for authorization of the encrypted fragments of the digital content. In one embodiment of the present invention the authorization is enabled by requesting management server for license keys corresponding to the plurality of encrypted fragments of the digital content. Each fragment can be associated with a unique license key.

Various embodiments of the present invention provides a method and system that helps in protecting the rights of content owners or content providers, while enabling consumers to obtain the digital content easily and legitimately. In an embodiment of the present invention, a protection mechanism as described in the present invention can be assigned to a receiver in a broadband provider's network and to the digital content itself. This can prevent illegal distribution of the digital content, in case the receiver is compromised. In another embodiment of the present invention, an individualization mechanism can make a combination of a receiver and a user unique by linking the user and subscription information of the user to a receiver. Due to the individualization mechanism a receiver that has been compromised can be identified and disabled during a re-installation or a re-subscription process.

In yet another embodiment of the present invention, continuous monitoring of the digital content is implemented by partitioning the digital content into a plurality of fragments and by associating a license with each fragment. Further, each fragment can be encrypted separately to obtain a plurality of protected fragments, such that the license key required to decrypt each of the protected fragments is different for each protected fragment.

Partitioning of the digital content into a plurality of fragments and subsequent processing of each fragment separately reduces a volatile memory requirement at an electronic device of a user since the volatile memory would be required only to process each fragment as and when the electronic device receives the fragment, as opposed to processing the whole digital content. Additionally, the partitioning of the digital content enhances the security, since a storage at the receiver can contain only a few protected fragments in decrypted form, for example only a fragment of the digital content can be stored at a time in decrypted form on the storage, as opposed to the whole digital content being stored in decrypted form on the storage.

The present invention can be embodied in various forms. Further, the present invention can be used in or as a part of a plurality of applications. The embodiments, advantages and applications of the present invention as mentioned herein are not exhaustive.

What is claimed is:

1. A method for securely transmitting a digital content from a digital rights management (DRM) network to an electronic device having a volatile memory, the method comprising:
   partitioning the digital content into a plurality of fragments;
   associating a plurality of licensing keys correspondingly with the plurality of fragments;
   associating a plurality of encryption keys correspondingly with the plurality of fragments;
   encrypting each of the plurality of encryption keys correspondingly with each of the plurality of fragments to become a plurality of encrypted fragments; and
   sending the plurality of encrypted fragments to the electronic device, in response to receiving a request for the digital content.

2. The method of claim 1, wherein the digital content is stored on a management server in the DRM network.

3. The method of claim 1, wherein the digital content is provided by one of a video production house, a film production house, a site management company, a television channel, a documentary production house and a company that creates games to be played on a computer or a similar device.

4. The method of claim 1, wherein the step of encrypting is performed using a 1024-bit triple data encryption standard (3DES) equivalent algorithm.

5. The method of claim 1, wherein the request for the digital content is originated from the electronic device.

6. The method of claim 1, wherein the request for the digital content is originated from a management server in the DRM network.

7. A method for communication between a digital rights management (DRM) network and an electronic device, the method comprising:

transmitting a digital content to the electronic device having a non-volatile memory and a volatile memory, the digital content being stored on a management server of the DRM, wherein the step of transmitting comprises:

partitioning the digital content into a plurality of fragments;

associating a plurality of unique licensing keys correspondingly with the plurality of fragments;

associating a plurality of unique encryption keys correspondingly with the plurality of fragments;

encrypting each of the plurality of fragments correspondlingly with the plurality of unique encryption keys to become a plurality of encrypted fragments;

sending the plurality of encrypted fragments to the electronic device; and decrypting each of the plurality of encrypted fragments of the digital content by the electronic device; and wherein each decrypted fragment is stored entirely in the volatile memory and not stored in the non-volatile memory of the electronic device to prevent a security compromise of the decrypted fragments should the non-volatile memory be uninstalled from the electronic device.

8. The method of claim 7, wherein the step of decrypting the plurality of encrypted fragments comprises requesting for an authorization to receive the plurality of encrypted fragments of the digital content.

9. The method of claim 8, wherein the step of authorization further comprises requesting to receive the plurality of unique license keys corresponding with the plurality of fragments.

10. The method of claim 7, where the digital content comprises multi-media content.

11. A system for communication in a Digital rights management (DRM) network, the system comprising:

a transceiver;

a transceiver-processor, the transceiver adaptively coupled with the transceiver-processor, the transceiver-processor being configured to:

partition a digital content into a plurality of fragments;

associate a plurality of licensing keys correspondingly with the plurality of fragments;

associate a plurality of encryption keys correspondingly with the plurality of fragments;

encrypt each of the plurality of encryption keys correspondingly with each of the plurality of fragments to become a plurality of encrypted fragments;

send the plurality of encrypted fragments; and an electronic device comprising an electronic-processor having a non-volatile memory and a volatile memory, wherein the electronic-processor being configured to decrypt each of the plurality of encrypted fragments of the digital content and wherein each of the plurality of encrypted fragments is stored in the volatile memory without having to store in the non-volatile memory of the electronic device to prevent a security compromise of the decrypted segment should the non-volatile memory containing the decrypted fragments be uninstalled from the electronic device.

12. The system of claim 11, wherein the electronic-processor is configured to request an authorization to receive the plurality of encrypted fragments of the digital content.

13. The system of claim 12, wherein the electronic-processor is configured to request for the plurality of licensing keys.

14. The system of claim 11, wherein the electronic device is a set-top box, a computing device, a multi-media player and a television set.

15. The system of claim 14, wherein the computing device is a personal computer, a mobile phone and personal digital assistant (PDA).

* * * * *